(12) United States Patent
Gort et al.

(10) Patent No.: US 6,789,832 B2
(45) Date of Patent: Sep. 14, 2004

(54) ARTICLE ATTACHMENT SYSTEM

(75) Inventors: Dale A. Gort, Holland, MI (US); Leif A. Norland, Holland, MI (US); David B. Fry, Holland, MI (US)

(73) Assignee: Johnson Controls Technology Company, Plymouth, MI (US)

( * ) Notice: Subject to any disclaimer, the term of this patent is extended or adjusted under 35 U.S.C. 154(b) by 0 days.

(21) Appl. No.: 10/041,721

(22) Filed: Jan. 4, 2002

(65) Prior Publication Data

US 2003/0127878 A1 Jul. 10, 2003

(51) Int. Cl.$^7$ ................................................ B60N 3/12
(52) U.S. Cl. ....................... 296/37.8; 248/323; 224/547
(58) Field of Search ........................... 296/37.8, 37.12, 296/37.13, 37.14, 37.15, 37.16; 248/323, 911, 912; 224/547, 554, 548, 281

(56) References Cited

U.S. PATENT DOCUMENTS

| | | | | |
|---|---|---|---|---|
| 4,173,382 A | * | 11/1979 | Booty | 439/117 |
| 5,180,089 A | * | 1/1993 | Suman et al. | 224/547 |
| 5,599,086 A | * | 2/1997 | Dutta | 362/490 |
| RE35,485 E | * | 4/1997 | Stewart | 248/429 |
| 5,676,284 A | | 10/1997 | Schenberg | |
| 6,135,529 A | * | 10/2000 | De Angelis et al. | 296/37.8 |
| 6,203,088 B1 | * | 3/2001 | Fernandez et al. | 296/37.8 |
| 6,338,517 B1 | * | 1/2002 | Canni et al. | 296/37.8 |
| 6,619,716 B1 | | 9/2003 | Sturt | |
| 2003/0184111 A1 | | 10/2003 | Sturt | |

FOREIGN PATENT DOCUMENTS

| | | |
|---|---|---|
| EP | 0 361 094 A1 | 4/1990 |
| EP | 0 960 785 A2 | 12/1999 |
| JP | 10291442 | 11/1998 |
| JP | 2001055091 | 2/2001 |

OTHER PUBLICATIONS

International Search Report on International Application No. PCT/US 02/41674, Form PCT/ISA/210 (patent family annex) (1 sheet).

* cited by examiner

Primary Examiner—Joseph D. Pape
(74) Attorney, Agent, or Firm—Foley & Lardner LLP

(57) ABSTRACT

An article attachment system is disclosed for a vehicle having one or more receiving members. The system includes a base having an attachment device to couple and uncouple the base with the receiving member. The base is configured to interchangeably receive an article and includes a retention device to selectively retain and release the article. A universal mounting adapter is also disclosed for interchangeably attaching articles to a receiving member and includes a base adapted to couple to the receiving member, a selectively deployable attachment device adapted to engage a portion of the receiving member and couple the base to the receiving member, an article interface to couple an article to the base, and a retention device between the article interface and the base.

43 Claims, 6 Drawing Sheets

ARTICLE ATTACHMENT SYSTEM

CROSS REFERENCE TO RELATED APPLICATIONS

The following patent application is hereby incorporated by reference: U.S. patent application Ser. No. 09/846,811 titled "Modular System For A Vehicle" filed May 1, 2001.

FIELD OF THE INVENTION

The present invention relates to an article attachment system, and more particularly relates to a system for interchangeably attaching a variety of articles for use with a vehicle.

BACKGROUND OF THE INVENTION

Modular storage compartments in the forward portion of vehicles are generally known and include consoles and structures for mounting items such as lamps, small storage compartments and electronic instrumentation such as compasses, temperature displays and clocks. Such modular systems typically have mounting configurations that permanently attach such articles to a structural portion of the vehicle, whereby installation of article options are typically conducted in a factory setting during vehicle construction and often requires user-selection of the desired articles prior to vehicle assembly, or user acceptance of preinstalled option packages. Such articles or components are typically attached directly to a particular position on the vehicle structure and often are not interchangeable and are not suitable for receiving a wide variety of other articles or components useful in a vehicle.

Accordingly, it would be advantageous to provide an article attachment system that may be mounted at various locations within a vehicle. It would also be advantageous to provide an article attachment system adapted to receive a wide array of selectively removable and positionable, user-oriented articles that are adapted for use within, or in conjunction with, a vehicle. It would be further advantageous to provide such an attachment system capable of fixed or sliding attachment along a portion, or substantially the entire length, of the interior overhead portion of a vehicle as well as the interior sides of a vehicle, or within the interior cargo space of a vehicle. It would be further advantageous to provide a variety of configurations for removable attachment of interchangeable articles.

Accordingly, it would be advantageous to provide an article attachment system for a vehicle having any one or more of these or other advantageous features.

SUMMARY OF THE INVENTION

One embodiment of the invention relates to an article attachment system for use with a vehicle having one or more receiving members coupled to the vehicle interior. The system includes a base having an attachment device adapted to selectively couple the base to the receiving member and to selectively uncouple the base from the receiving member. The base is further adapted to interchangeably receive one or more articles and includes a retainer device adapted to retain the article and a release device adapted to release the article.

Another embodiment of the invention relates to an article attachment system for a vehicle and includes means for releasably coupling a base to one or more elongated members in the interior of a vehicle, means for removably coupling one or more articles to the base, and means for preventing sliding motion of the base when the article is coupled to the base.

A further embodiment of the invention relates to a kit for an article attachment system in a vehicle having one or more elongated members coupled to an interior portion of the vehicle, the kit includes a base portion adapted to be coupled to the elongated member, an attachment device adapted to couple the base to the elongated member, a retention device adapted to retain an article in coupled engagement with the base and a release device adapted to uncouple the article from the base.

Another further embodiment of the invention relates to a method of mounting an article on a vehicle having one or more receiving members and includes coupling a base to the receiving member by engaging an attachment device with the receiving device, removably coupling the article to the base by engaging a retention device on the base, and providing an interlock to prevent removal of the article from the base when the base is coupled to the receiving member.

Another further embodiment of the invention relates to a universal mounting adapter for interchangeably attaching articles to a receiving member and includes a base adapted to releasably couple to the receiving member, the base having a selectively deployable attachment device adapted to engage a portion of the receiving member and maintain the base operably coupled to the receiving member. The base also includes an article interface adapted to interchangeably couple one or more articles to the base, a retention device for maintaining the article in a coupled relationship with the base, and a selectively deployable release device for uncoupling the article from the base.

DETAILED DESCRIPTION OF THE PREFERRED EMBODIMENTS

Referring to FIGS. 1–4A, an attachment system 10 for mounting one or more articles is shown schematically (exemplary articles will be further described herein). In a preferred embodiment, system 10 is adapted to selectively mount at one or more locations on a structure along an interior panel (e.g. door or side panel, cover; headliner, floor, etc.) and interchangeably receive any one or more of a plurality of articles. System 10 provides a mounting device (e.g. fixture, bracket, etc.) that preferably mounts to a receiving device in the form of an elongated mounting member 12 (shown schematically in FIG. 10A as a track or rail, but may be any fixture, bracket, projection, etc.) and described in detail in U.S. patent application No. 09/846,811 the disclosure of which is incorporated herein by reference, but may be adapted to mount on any suitable interior or exterior vehicle component. System 10 may include a base portion 20 (e.g. block, fixture, bracket, etc.) that is configured to receive an article interface portion 60 that has a structure adapted to receive one or more articles. In a particularly preferred embodiment, the system's combination of base portion 20 and article interface portion 60 provide a generally triangular block or wedge shape with the base of the triangle at the wide end 22 of base portion 20 having a base attachment profile 26 for mating with the elongated mounting member 12, and the apex of the triangle at an opposite end of the article interface portion 60 to provide a streamlined profile for receiving articles. Base attachment profile 26 may be contoured to provide a mating fit with the shape of the elongated mounting member 12, and may include a projection (shown schematically as a rib or ledge 28) for engaging a mating contour 14 or profile (shown schematically on FIG. 10A) on the elongated mounting member 12. In alternative embodiments the article interface portion may have other shapes and utility features, for example, it may be any shape suitable for mounting articles and engaging base portion 20, such as elongated holders or racks, handle members, posts, columns or pillars, etc.

Base portion 20 may be configured to permit sliding movement or prevent sliding movement along the elongated mounting member 12. To prevent sliding movement, a positioner may be included such as a frictional interface 30 (e.g. a material or surface with a high frictional coefficient or other device to prevent sliding movement of base portion 20 along the elongated mounting member 12). Alternatively, elongated member 12, base portion 20 or an attachment device 40 (to be further described herein) may include positioners for positioning base portion 20 along the elongated mounting member 12. Such positioners may include spring-biased catches (not shown) that may engage a plurality of corresponding recesses or apertures 13, or a projections or protrusions 15 located along the elongated mounting member, or the positioning device may include clamps, slide-locks, quarter-turn cam-locks, threaded fasteners or other clamping devices.

The article interface portion 60 may have a receiving interface shown schematically as a loop or aperture 62, but may be any suitable structural interface such as a clamp, buckle, socket, quick-release device, etc. for receiving articles. In a preferred embodiment, article interface portion 60 is removably received within a narrow end 24 of base portion 20 using a releasable retention device such as release actuator 38 (to be further described) and is locked upon insertion into base portion 20. An article release device 32 (to be further described) is provided on a side of base portion 20, which upon actuation will allow article interface portion 60 to be disengaged from base portion 20. In a particularly preferred embodiment, article release device 32 is a spring-biased push button, but may be a slide, lever, or rotational device in alternative embodiments. Base portion 20 further includes an attachment device 40 adapted to releasably attach base portion 20 to elongated mounting member 12. In a particularly preferred embodiment, attachment device 40 is a flat lever that is suitably recessed into base portion 20 to maintain the overall uniform triangular profile of base portion 20.

Referring to FIGS. 4B–9, attachment device 40 preferably includes an interlock 50 (to be further described herein) adapted to allow removal of base portion 20 from elongated mounting member 12 only when article interface 60 is disengaged from base portion 20. Interlock 50 provides a safety feature in that when article interface portion 60 is engaged in base portion 20 and capable of holding one or more articles, system 10 cannot be removed from elongated mounting member 12, thus requiring removal of the article and article interface portion 60 before base portion 20 may be detached. In alternative embodiments, an interlock may be omitted and the attachment device may have other suitable shapes or operating configurations.

Referring further to FIGS. 4B–9, the internal structure of the article attachment system is shown according to a preferred embodiment. A releasable retention device shown as release actuator 38 includes an article release device 32, a catch device 34, and projecting structure 39. Release actuator 38 may be formed as a single integrated unit or article release device 32, catch device 34 and projecting structure 39 may be formed as separate pieces coupled together. An internal biasing device, such as a spring 31 (e.g. coil spring, leaf spring, etc.) biases the release actuator 38 to a withdrawn (i.e. locked) position with the article release device 32 projecting outward from the base portion 20.

Release actuator 38 may include projecting structure 39 for operably contacting and selectively displacing catch device 34 upon actuation of the article release device 32. The catch device 34 (shown schematically as a sliding bolt with an angled projection) may be spring-biased (not shown) to maintain catch device 34 in a normally engaged (i.e. locked) position to retain article interface portion 60. In a particularly preferred embodiment, projecting structure 39 has the shape of two elongated parallel arms (shown as tongs, forks, etc.) that are reciprocally movable past each side of engagement plate 64 to contact and depress the spring-biased catch device 34 when article release device 32 is actuated. Release actuator 38 is preferably made of polycarbonate or acrylonitrile butiadene styrene (ABS) plastic in an extrusion process or an injection molding process, but may be made of any material, such as metal, having suitable strength for repeated actuation and displacement of catch device 34, or may be made in other processes such as stamping or die casting. According to alternative embodiments, the release actuator may have other shapes and operating structure such as a rotational or cam-driven device.

When release of the article interface portion 60 from the base portion 20 is desired, article release device 32 is depressed inwardly, causing release actuator 38 to depress the spring-biased catch device 34, causing it to release from the engagement plate 64 and allow the article interface portion 60 to be withdrawn and removed from base portion 20. In a preferred embodiment, catch device 34 is made of zinc-plated steel in a die cast process, but may be aluminum or any suitable material such as plastic made in an injection molding process for sliding, spring-biased movement within a cavity of base portion 20 and for retaining article interface portion 60 and any articles that may be suspended therefrom or attached thereto.

Referring further to FIGS. 4B–9, article interface portion 60 may have a projecting engagement plate 64 having suitable contours 66 (e.g. projections, shoulders, notches, indentations, apertures, etc.) for engaging catch device 34. In a particularly preferred embodiment, article interface portion 60 may be assembled from two article interface sections 68 having a sufficient thickness of material to provide an interlock 50 (to be described further herein) and fastened securely together with, and on either side of, engagement plate 64 by fasteners, adhesive, interference fit, snap-fit or other retention device, to allow the article interface sections 68 and engagement plate 64 of the article interface portion 60 to operate as a unitary whole. In a particularly preferred embodiment, article interface sections 68 are made of polycarbonate, ABS plastic, or other polymeric material in an insert or injection molding process, and engagement plate 64 is made of chrome plated steel in a stamping process; however, other suitable materials such as aluminum, plastic, etc. formed by any suitable process may be used in alternative embodiments.

Referring further to FIGS. 4B–9, base portion 20 may be composed of one or more base sections 36 adapted to mate together and be retained by alignment projections and apertures (not shown), and adhesive, fasteners, mating snap-fit or interference fit portions or any other suitable holding device to securely maintain base portion 20 together as a unitary whole. Base portion 20 further includes suitable cavities or passages for accommodating the placement and movement of the interior components. Base portion 20 accommodates the catch device 34 so that insertion of article interface portion 60 into base portion 20 will result in catch device 34 latching or otherwise engaging with the engagement plate 64 in a locking relationship to prevent removal or withdrawal of the article interface portion 60 from the base portion 20 once the engagement plate 64 has engaged the catch device 34.

Referring further to FIGS. 5–9, attachment device 40 and interlock 50 are shown according to a preferred embodiment. Attachment device 40 has a top portion 42 with an engagement profile 44 (shown schematically as a projection) for engaging contour 14 of elongated mounting member 12 when the system 10 is mounted to elongated mounting member 12. Engagement profile 44 is configured to substantially conform with ledge 28 on base attachment profile 26 to provide a substantially continuous mounting structure between elongated mounting member 12 and system 10. A pivot member 46 (shown schematically as a rod, but may be any suitable pivot device such as mating pins and apertures) is secured on opposite ends by apertures in base sections 36, but can be secured in any suitable manner. Attachment device 40 includes tabs 48 having apertures sized to fit over pivot member 46 which acts as a fulcrum such that top portion 42 and a bottom portion 52 of attachment device 40 are capable of acting as a lever for pivoting movement about pivot member 46.

In a preferred embodiment, a biasing device 54 (shown schematically as a spring, but may be any suitable biasing device such as a coil spring or leaf spring) is coupled to pivot member 46 and urges bottom portion 52 of attachment device 40 outwardly and urges top portion 42 of attachment device 40 inwardly for engagement of profile 44 with contour 14 of elongated mounting member 12. The base portion 20, without article interface portion 60 inserted, may be mounted on elongated mounting member 12 by engaging ledge 28 into the corresponding contour 14 of elongated mounting member 12 and then pressing or pushing the opposite side of base portion 20 upward into engagement whereby profile 44 snaps into engagement with the corresponding contour 14 on the opposite side of elongated mounting member 12.

When article interface portion 60 is withdrawn from base portion 20, the base portion 20 may be removed from elongated mounting member 12 by manually depressed the lower portion 52 inwardly to rotate top portion 42 outwardly about fulcrum or pivot member 46 so that profile 44 releases from contour 14. In a preferred embodiment, a safety feature is provided to prevent removal of base 20 when the possibility exists that an article may be attached to base 20. The safety feature includes interlock 50, such that when article interface portion 60 is inserted into base portion 20, interlock 50 is aligned in close-fit relationship with a front edge 51 of lower portion 52, thus providing an interfering block or barrier that prevents inwardly motion of lower portion 52 and thus prevents removal of base portion 20 from elongated mounting member 12 when article interface portion 60 is installed. The interlock 50 thus prevents base portion 20 from being accidentally or inadvertently released from elongated mounting member 12 when the possibility exists for having one or more articles attached to, or suspended from, the system 10. Attachment device 40 is preferably made of aluminum in a die cast process and pivot member 46 is preferably made of steel in an extrusion process, but any other suitable material may be used having sufficient strength to support articles suspended from, or mounted on, article interface portion 60.

According to any preferred embodiment, system 10 is capable of removably and interchangeably receiving and supporting a wide variety of articles for use within or in conjunction with a vehicle. Such articles may include commercial, industrial or consumer-oriented articles, including, but not limited to: storage compartments; auxiliary mounting structures such as handles, brackets, fixtures for direct or indirect-mounting capability for racks, cages, or support pillars for optionally mounting additional articles such as portable shelving or carriers in a cargo area; lighting equipment, power adapters and outlets; media devices such as visual display screens, audio equipment, media displays, digital video disc players, GPS receivers; utility devices such as cargo storage racks, cargo netting and holders, straps or tie-downs, garment hangers, rods or racks; insulated hot or cold-storage containers; mobile office workstation components; tools or equipment such as portable air compressors or vacuum cleaners; occupant safety devices; specially-adapted consumer-use products such as travel tables, camping gear, pet barriers, luggage, etc.; brackets having rigid, swiveling or rotating couplers for removably receiving these or other such articles; storage racks having fixed or retractable support members for storing skis or other gear; and any other articles which may be useful in conjunction with traveling, working or other use of a vehicle.

In other alternative embodiments, elongated mounting members having electrically conductive or utility-carrying portions may be provided to deliver electrical power or data or communication signals to the articles. In order to provide an interface between the elongated mounting members and the articles, the body portion and the article attachment portion may include electrically conductive portions (not shown) such as a conductor or metallic strip that is operably engaged with the elongated mounting member 12 and is conductively coupled to a region of the article interface portion 60 through the engagement plate 64.

Figures 1, 2:
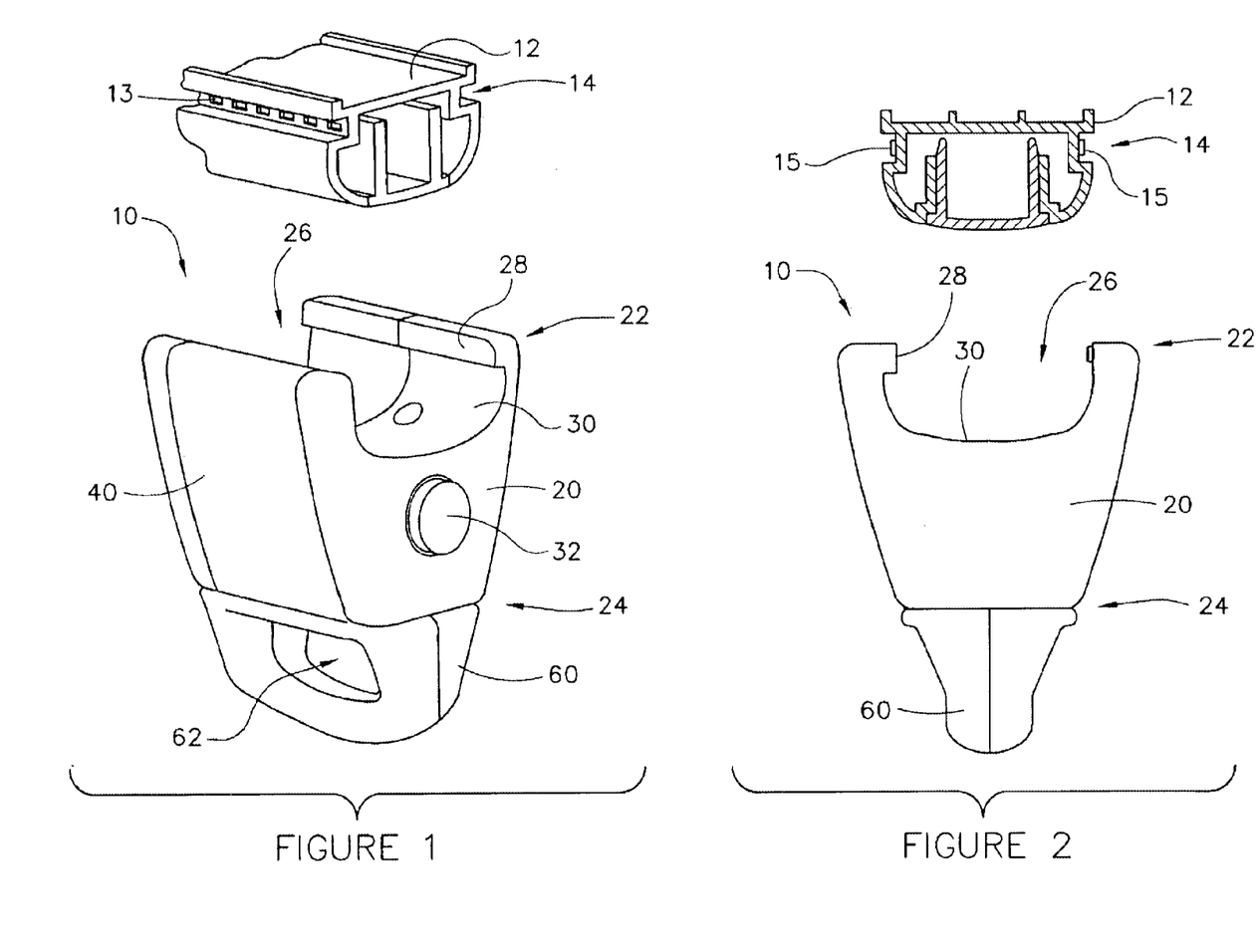
FIG. 1 is an assembled perspective view of an article attachment system for a vehicle according to a preferred embodiment.
FIG. 2 is a first end view of an article attachment system for a vehicle according to a preferred embodiment.
Figure 3:
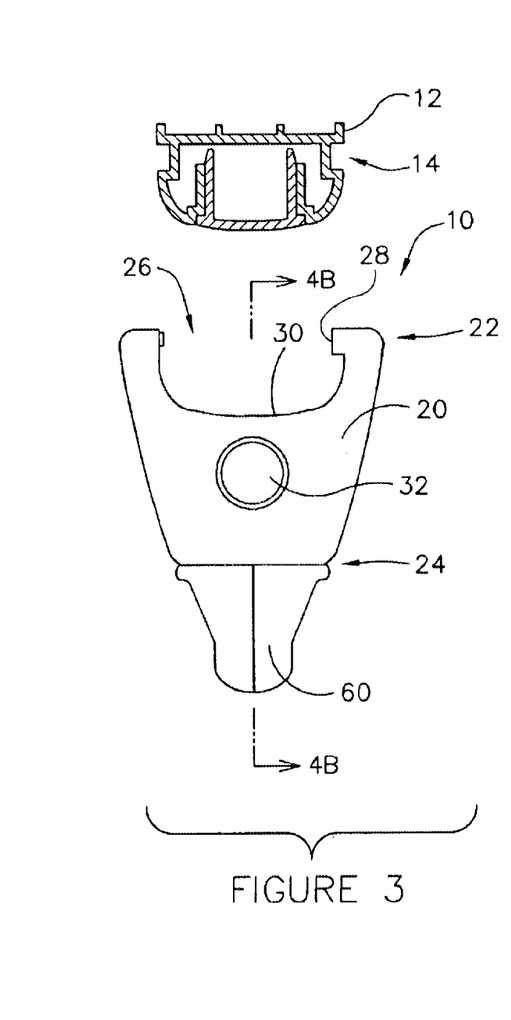
FIG. 3 is an second end view of an article attachment system for a vehicle according to a preferred embodiment.
Figure 4A:
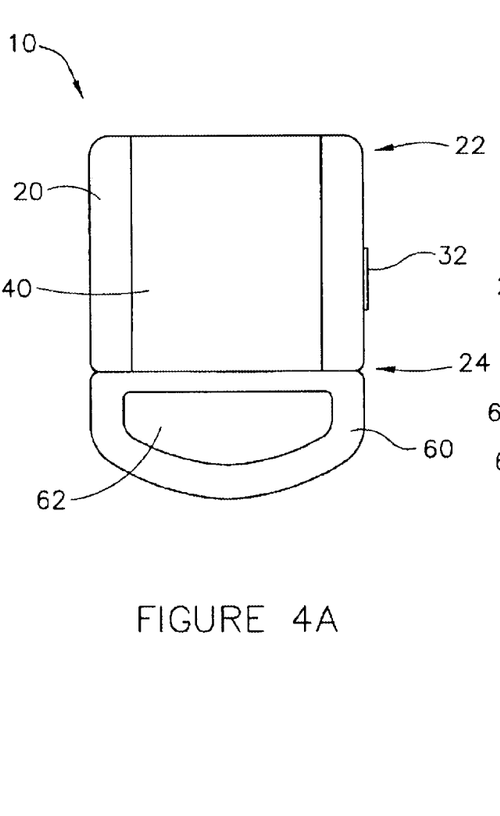
FIG. 4A is a side view of an article attachment system for a vehicle according to a preferred embodiment.
Figure 4B:
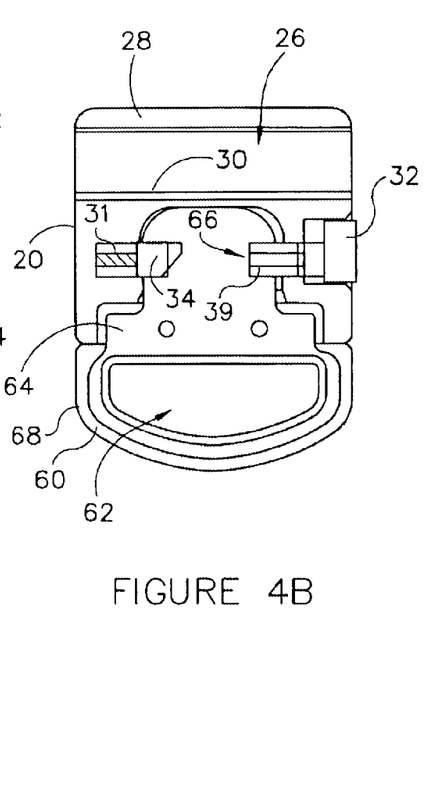
FIG. 4B is a cross section view of the article attachment system of FIG. 3 according to a preferred embodiment.
Figure 5:
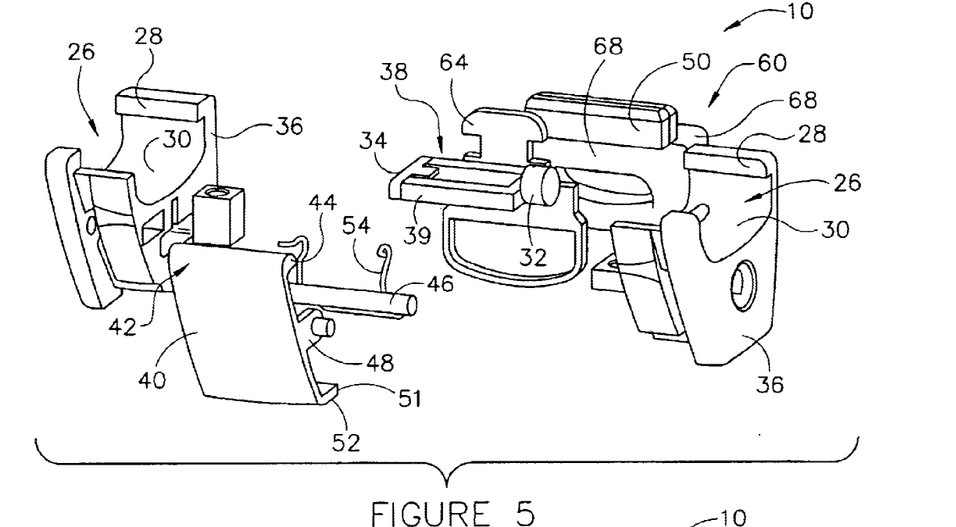
FIG. 5 is an exploded front perspective view of an article attachment system for a vehicle according to a preferred embodiment.
Figure 6:
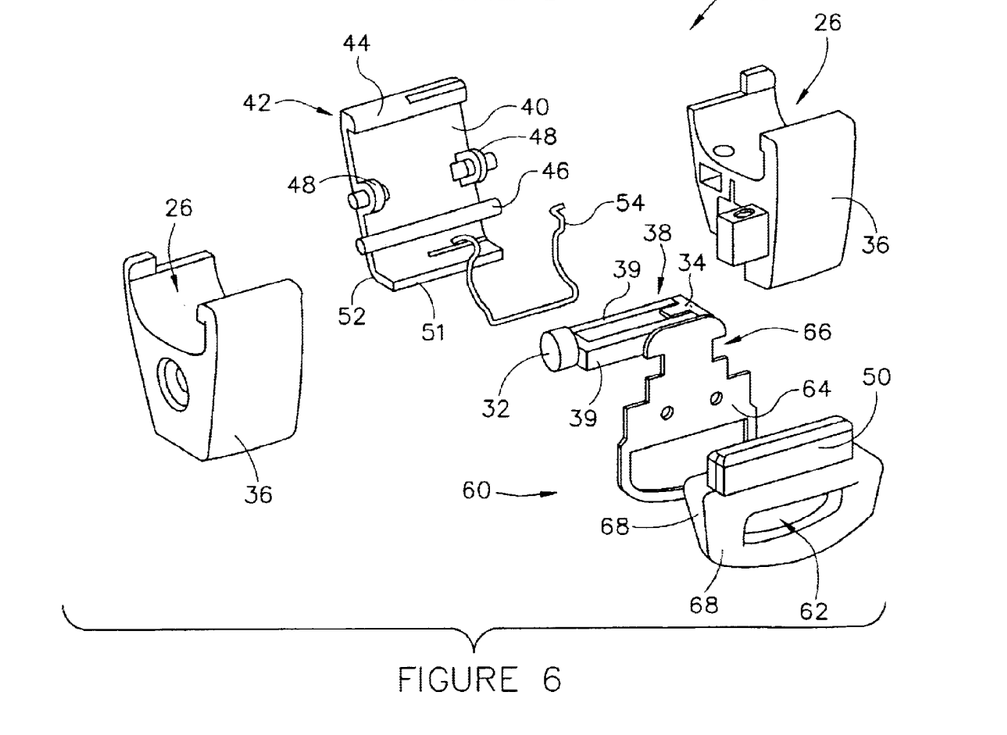
FIG. 6 is an exploded rear perspective view of an article attachment system for a vehicle according to a preferred embodiment.
Figure 7:
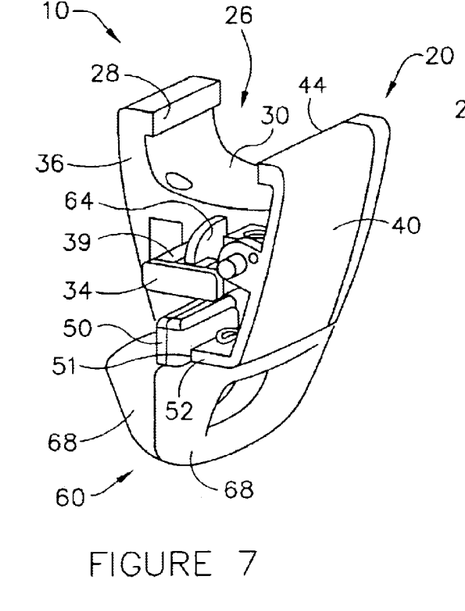
FIG. 7 is an internal front perspective view of an article attachment system for a vehicle according to a preferred embodiment.
Figure 8:
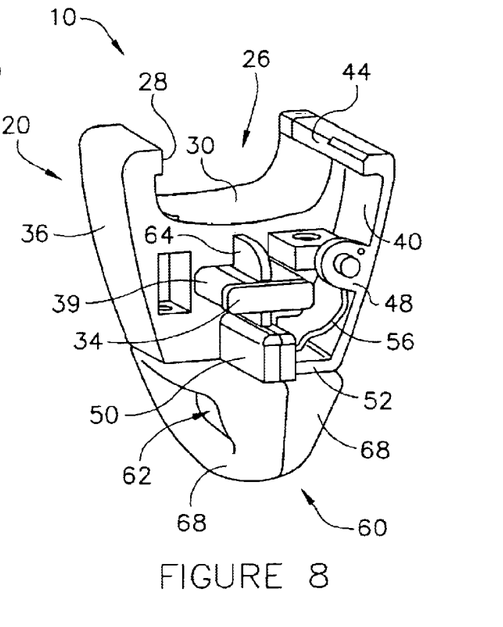
FIG. 8 is an internal rear perspective view from a first side of an article attachment system for a vehicle according to a preferred embodiment.
Figure 9:
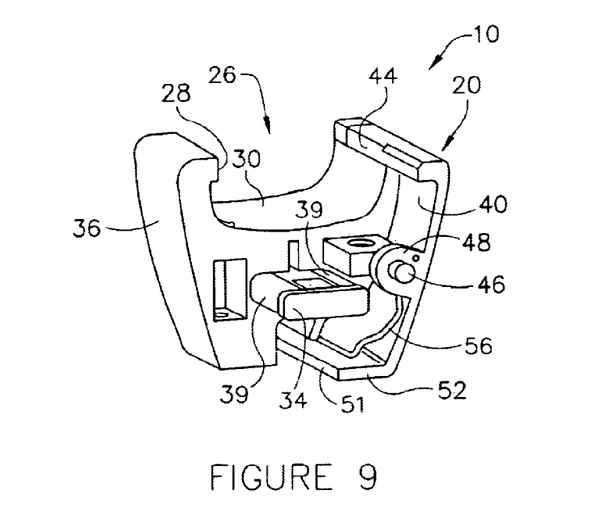
FIG. 9 is an internal rear perspective view from a second side of an article attachment system for a vehicle according to a preferred embodiment.
Figure 10A:
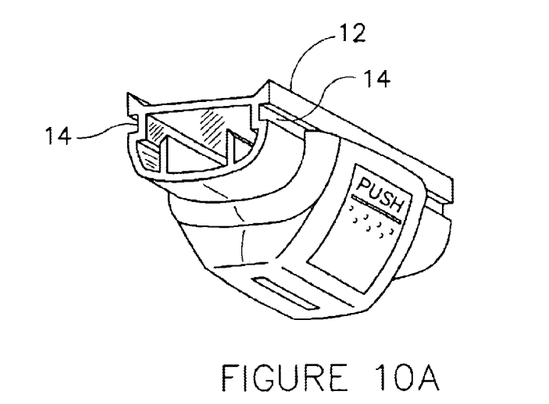
FIG. 10A is a front perspective view from a first side of an article attachment system for a vehicle according to an alternative embodiment.
Figure 10B:
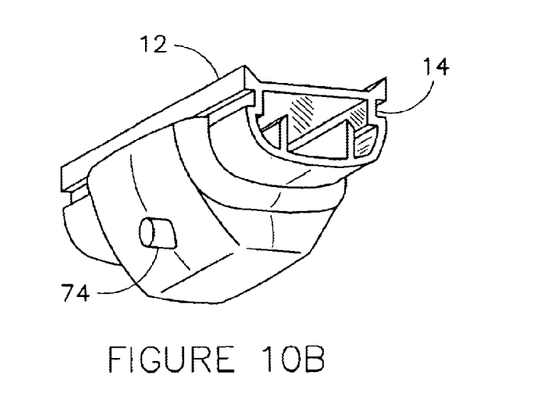
FIG. 10B is a front perspective view from an opposite side of the article attachment system of FIG. 10A for a vehicle according to an alternative embodiment.
Figure 10C:
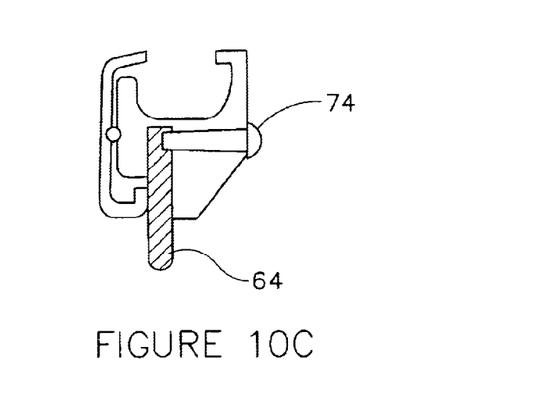
FIG. 10C is a cross sectional view of the article attachment system of FIG. 10B for a vehicle according to an alternative embodiment.

Referring to FIGS. 10A–C, an article attachment system is shown according to an alternative embodiment. A spring-biased plunger 74 may be provided for releasably latching with the engagement plate 64. Plunger 74 may be oriented in planar coordination with the plane of the engagement plate 64 for engaging notches in engagement plate 64 or may be oriented perpendicular to the plane of the engagement plate 64 for engaging a recess or aperture in engagement plate 64.

Figure 11A:
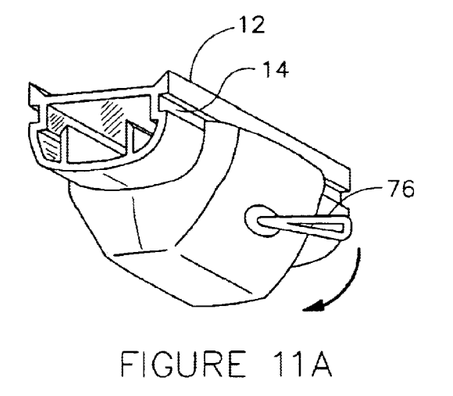
FIG. 11A is a front perspective view from a first side of an article attachment system for a vehicle according to another alternative embodiment.

Referring to FIG. 11A, an article attachment system is shown according to an alternative embodiment. A quarter-turn locking device 76 may be provided on the base portion for drawing opposite sides of the base portion into a clamped configuration on elongated mounting member 12. Locking device 76 may be any conventional quarter-turn device such a typical bicycle quick-release wheel hub lock or any other rotatable quick-release type device for releasably locking the base portion to elongated member 12.

Figure 11B:
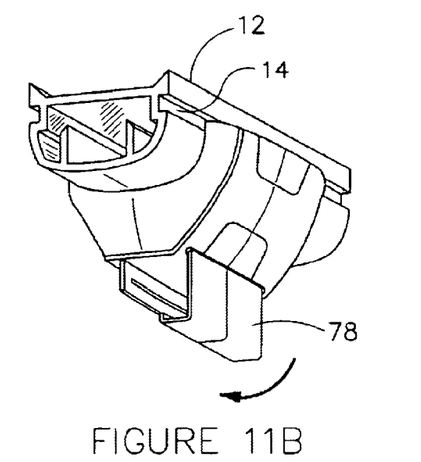
FIG. 11B is a front perspective view from an opposite side of the article attachment system of FIG. 11A for a vehicle according to an alternative embodiment.

Referring to FIG. 11B, an article attachment system is shown according to another alternative embodiment. A latching device 78 may be provided on the base portion for drawing opposite sides of the base portion into a clamped configuration on the elongated mounting member 12. Latching device 78 may be any conventional latch device such as watch-type clasp or any other suitable latching-type clasp for releasably locking the base portion to elongated mounting member 12.

Figure 12:
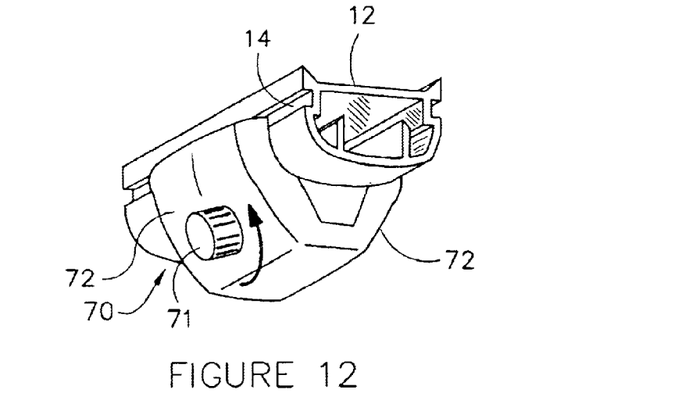
FIG. 12 is a front perspective view of an article attachment system for a vehicle according to a further alternative embodiment.

Referring to FIG. 12, an article attachment system is shown according to an alternative embodiment. A rotational clamping device 70 may be provided that clamps hingeable or movable sides 72 of the base portion into locked engagement with contours 14. Rotational clamping device 70 may include a threaded member and an enlarged knob 71 or handle for improved manual operation.

Figure 13A:
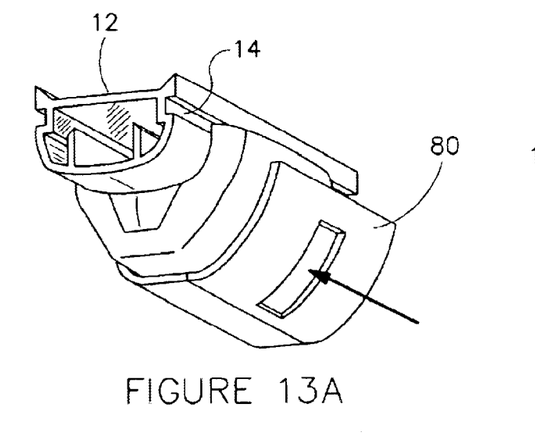
FIG. 13A is a front perspective view of an article attachment system for a vehicle according to another alternative embodiment.
Figure 13B:
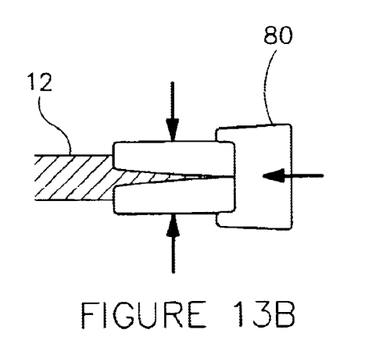
FIG. 13B is a bottom view of the article attachment system of FIG. 13A for a vehicle according to another alternative embodiment.

Referring to FIGS. 13A and 13B, an article attachment system is shown according to a further alternative embodiment. A slide member 80 may be provided that slides along a longitudinal path and clamps movable sides of the base portion into locked engagement with the contours 14. Slide member 80 may provide an interference fit or snap-fit engagement into a locking position on the body portion.

It is important to note that the construction and arrangement of the elements of the article attachment system for a vehicle provided herein are illustrative only. Although only a few exemplary embodiments of the present invention have been described in detail in this disclosure, those skilled in the art who review this disclosure will readily appreciate that many modifications are possible in these embodiments (such as variations in installation location and orientation within a vehicle, sizes, structures, shapes and proportions of the various elements, mounting arrangements, configuration and operation of biasing devices, arrangement of utility-carrying conductors, use of materials, colors, combinations of shapes, etc.) without materially departing from the novel teachings and advantages of the invention. For example, the system may be used in the interior of any vehicle (such as an automobile, truck, sport utility vehicle, van, boat, airplane, train, construction or farming equipment, tractor trailer trucks, motor homes and recreational vehicles, etc.). According to other alternative embodiments, the article attachment system may be used in connection with articles such as camping gear that are designed to adapt to a stationary vehicle environment. Further, it is readily apparent that variations of the system may be provided in a wide variety of shapes, sizes, thickness, and engagement profiles and adapted for installation along the roof, floor and sides of a vehicle, or within a cargo area or other suitable location within a vehicle. It is also readily apparent that the system may be designed with any attachment profile suitable for attaching to one or more members and may be adapted for slidable movement along the members. For example, the article interface portion may have any shape or utility features adapted to engage the base portion and receive articles for mounting, attachment or storage, such as blocks, elongated holders, posts, compartments, or other shapes useful for receiving articles. Accordingly, all such modifications are intended to be within the scope of the invention as defined in the appended claims.

What is claimed is:

1. A system for attaching articles in a vehicle, comprising:
   a base having an attachment device adapted to selectively couple the base to a receiving member within the vehicle and adapted to selectively uncouple the base from the receiving member;
   the base comprising a cavity adapted to interchangeably receive an article interface member; and
   the base having a retention device cooperating with the cavity adopted to selectively retain the article interface member and to selectively release the article interface member;
   so that an article may be attached to the receiving member.

2. The attachment system of claim 1, wherein the base is configured to attach at one or more locations along the receiving member.

3. The attachment system of claim 2, wherein the base is adapted to move in relation to the receiving member.

4. The attachment system of claim 2, wherein the base is adapted to be substantially non-movable in relation to the receiving member.

5. The attachment system of claim 4, wherein the base includes a friction device configured to engage the receiving member to substantially limit movement of the base in relation to the receiving member.

6. The attachment system of claim 4, wherein the base includes a positioning device configured to engage the receiving member to substantially prevent movement of the base in relation to the receiving member.

7. The attachment system of claim 1, wherein the article interface member comprises a portion adapted to receive the article.

8. The attachment system of claim 1, wherein the retention device includes a spring-biased catch adapted to retain the article.

9. The attachment system of claim 8, wherein the retention device includes a release device having an actuation member in operable engagement with the catch and configured to release the article.

10. The attachment system of claim 1, wherein the article interface member is a bracket adapted to interchangeably couple with one of a group of articles.

11. The attachment system of claim 10, wherein the articles are taken from the group consisting of a storage compartment, a hanger, a bracket, a fixture, a support member, a cargo storage shelf, an adaptable consumer product, a commercial-use article, and a business-related article.

12. The attachment system of claim 1, wherein the base further comprises an interlock adapted to prevent uncoupling the base from the receiving member when the article is coupled to the base.

13. The attachment system of claim 1, wherein the attachment device includes a lever and fulcrum mechanism.

14. The attachment system of claim 1 wherein the attachment device includes a push button.

15. The attachment system of claim 1 wherein the attachment device includes a slide mechanism.

16. The attachment system of claim 1, wherein the attachment device includes a clasp.

17. The attachment system of claim 1, wherein the attachment device includes a spring-biased hinge.

18. The attachment system of claim 1, wherein the attachment device includes a threaded fastener.

19. The attachment system of claim 1, wherein the attachment device includes a rotatable lever.

20. The attachment system of claim 1, wherein the base includes an electrically conductive path adapted to provide a utility interface between the receiving member and the article.

21. The attachment system of claim 1, wherein the receiving device member is an elongated track member mountable to one or more of a headliner, floor, cargo door or interior trim component of the vehicle.

22. An article attachment system for a vehicle, comprising:
   means for coupling a base to an elongated member in the interior of a vehicle; and
   means for coupling an article to the base.

23. The article attachment system of claim 22, wherein the means for coupling the base is accomplished without using tools.

24. The article attachment system of claim 22, further comprising means for preventing sliding motion of the base when the article is coupled to the base.

25. The article attachment system of claim 22, further comprising, means for preventing disengagement of the base from the elongated member when the article is coupled to the base.

26. A kit for attaching articles in a vehicle, the kit comprising:
   a base portion adapted to be coupled to at least one elongated member disposed within the vehicle;
   an attachment device adapted to couple the base to the at least one elongated member;
   a passage within the base portion configured to receive at least a portion of an article; and
   a retention device adapted to couple the article to the passage.

27. The kit of claim 26, further comprising an interlock adapted to prevent uncoupling the article from the base when the base is coupled to the at least one elongated member.

28. The kit of claim 26, wherein a portion of the base is electrically conductive.

29. The kit of claim 26, further comprising an article interface device receivable in the passage of the base and adapted to couple to the article.

30. The kit of claim 26, further comprising a positioning device adapted to substantially limit movement of the base relative to the at least one elongated member.

31. The kit of claim 26, wherein the retention device includes a latch adapted to retain the article.

32. The kit of claim 26, wherein the retention device includes a release device adapted to release the article.

33. A method of mounting an article on a vehicle, comprising:
   coupling a base to a receiving member disposed on the vehicle by engaging an attachment device with the receiving member;
   coupling the article to the base by engaging a retention device on the base; and
   providing an interlock to prevent removal of the base from the receiving member when the article is coupled to the base.

34. The method of claim 33, further comprising the step of coupling an article interface device to the base.

35. The method of claim 34, wherein the article is coupled to the article interface device.

36. The method of claim 33, further comprising the step of transmitting utilities through the base to the article.

37. The method of claim 33, further comprising the step of limiting the movement of the base relative to the receiving member.

38. The method of claim 33, further comprising the step of removing the article from the base by actuating a release device on the retention member.

39. A universal mounting adapter for interchangeably attaching articles to a receiving member, comprising:
   a base adapted to couple to the receiving member;
   the base having a selectively deployable attachment device adapted to engage a portion of the receiving member and maintain the base operably coupled to the receiving member;
   an article interface adapted to couple an article to the base;
   a retention device communicating with the article interface and the base; and
   an interlock device adapted to maintain the base in a coupled relationship with the receiving member when the article is coupled to the base.

40. The universal mounting adapter of claim 39, wherein the receiving member is an elongated rail coupled to an interior portion of a vehicle.

41. The universal mounting adapter of claim 39, wherein the retention device includes a spring-biased catch member for selectively holding the article to the base and selectively releasing the article from the base.

42. The universal mounting adapter of claim 39, wherein the retention device includes a manual actuator operably engaging the catch member.

43. The universal mounting adapter of claim 39, wherein the articles are taken from the group consisting of a storage compartment, a hanger, a bracket, a fixture, an adaptable consumer product, a commercial-use device, an industrial product, and a business-related article.

* * * * *

UNITED STATES PATENT AND TRADEMARK OFFICE
CERTIFICATE OF CORRECTION

PATENT NO. : 6,789,832 B2
DATED : September 14, 2004
INVENTOR(S) : Dale A. Gort, Leif A. Norland and David B. Fry It is certified that error appears in the above-identified patent and that said Letters Patent is hereby corrected as shown below:

Column 8,
Line 37, following "cavity" delete "adopted".

Column 9,
Line 33, preceding "member," first occurrence, delete "device".

Signed and Sealed this

Fifth Day of April, 2005

JON W. DUDAS
*Director of the United States Patent and Trademark Office*